July 21, 1953 — L. BOLTUCH — 2,646,242
UNIVERSAL JOINT
Filed Jan. 18, 1952 — 2 Sheets-Sheet 1
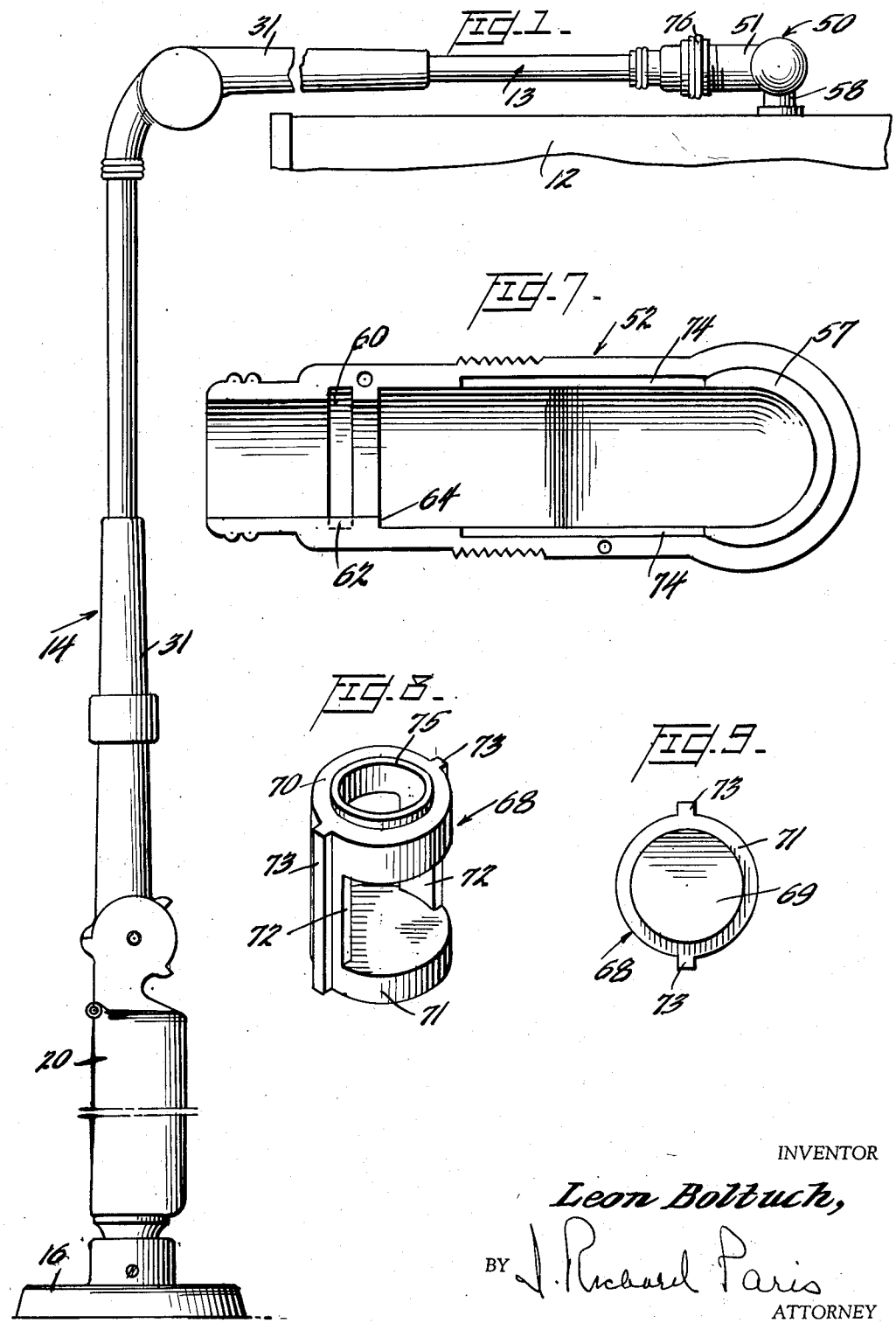
INVENTOR
Leon Boltuch,
BY J. Richard Paris
ATTORNEY July 21, 1953 — L. BOLTUCH — 2,646,242
UNIVERSAL JOINT
Filed Jan. 18, 1952 — 2 Sheets-Sheet 2
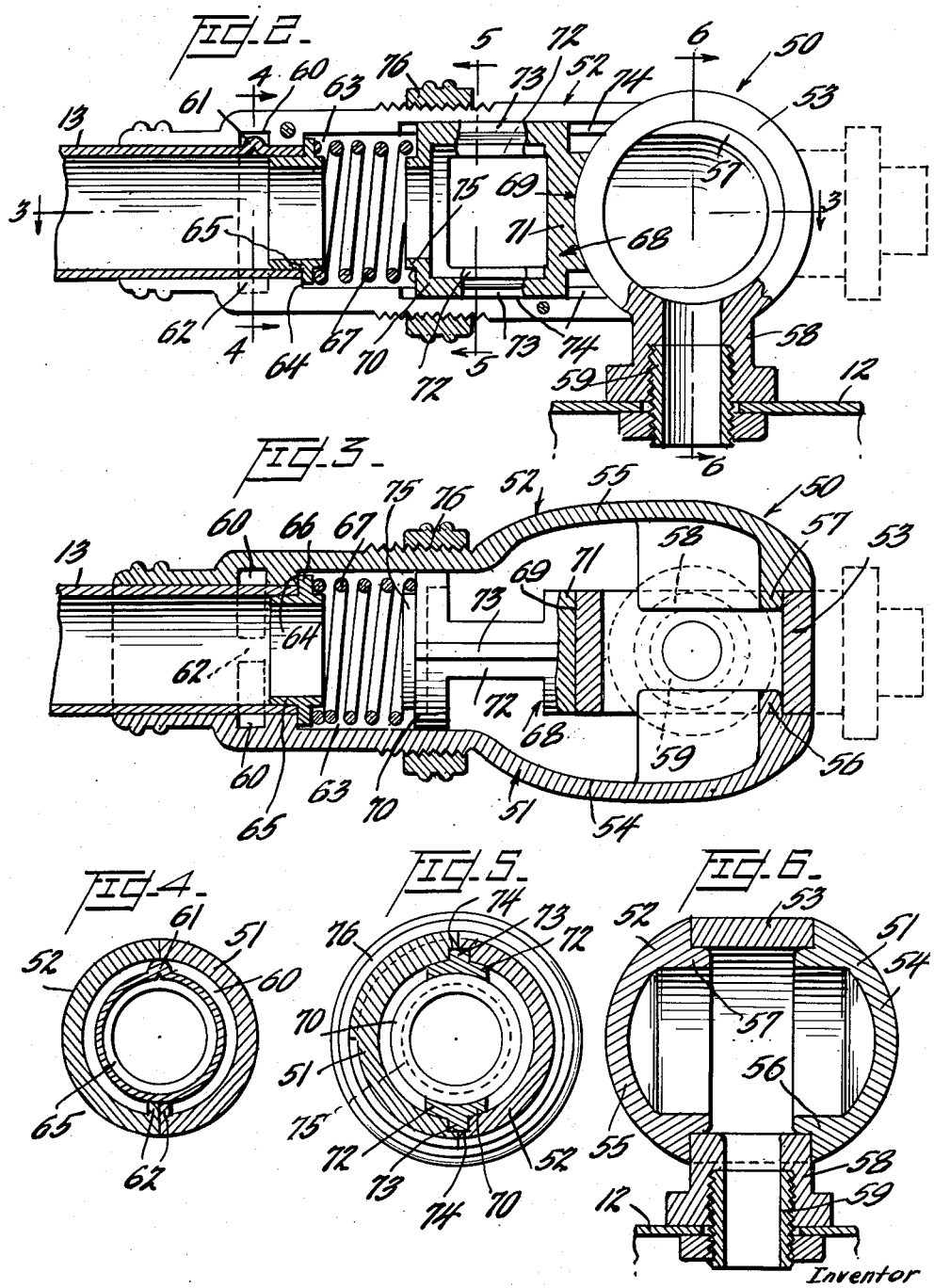
Inventor
Leon Boltuch,
BY J. Richard Paris
ATTORNEY Patented July 21, 1953

2,646,242

UNITED STATES PATENT OFFICE 2,646,242

UNIVERSAL JOINT

Leon Boltuch, Wallingford, Conn.

Application January 18, 1952, Serial No. 267,063

6 Claims. (Cl. 248—292)

The present invention relates to improved universal joints for use in connection with adjustable lamps or other relatively light loads, the particular aim being to provide a joint of simple and rugged construction and which will maintain the lamp or other load unit in its adjusted position.

Other objects and advantages of the present invention will appear in the accompanying drawings and the following specification.

In the drawings:

Fig. 1 illustrates generally a type of lamp embodying the present invention;

Fig. 2 is a longitudinal sectional view of the universal joint;

Fig. 3 is a view taken on line 3—3 of Fig. 2;

Fig. 4 is a sectional view taken on line 4—4 of Fig. 2;

Fig. 5 is taken on line 5—5 of Fig. 2;

Fig. 6 is taken on line 6—6 of Fig. 2;

Fig. 7 is a face view of one of the mating halves of the casing;

Fig. 8 is a perspective view of the brake shoe; and

Fig. 9 is a plan view of the brake shoe.

The universal joint of the present invention is particularly applicable and adaptable for use in the adjustable bracket shown and described in application Ser. No. 267,062, filed on even date January 18, 1952, and the said application is embodied herein by reference.

As shown in Fig. 1, the lamp embodying the adjustable bracket comprises a load unit 12 which is shown in the present case as a reflector carrying a pair of tubular discharge lamps, a pair of jointed bracket arms 13 and 14, a base 16 and a standard 20. As fully described in the above mentioned application, each of the bracket arms include a housing 31 in which a friction sleeve, a helical spring, and a link combine to provide a counterbalance for the load unit to maintain the same in any desired adjusted position.

The present invention is directed to the joint 50 which attaches the load unit 12 to the bracket arm 13, the joint being designed to provide for two axes of rotation of the lamp 12 with reference to the arm 13. More particularly the joint 50 contains within it the necessary elements for maintaining the load unit 12 in its desired adjusted position. The joint is also designed to receive the end of the arm 13 and to rotate thereon, thus providing rotation of the load unit 12 on the axis of the arm 13. In addition, the joint provides a second axis of rotation which is at right angles to the axis of the arm 13. Thus the position of the load unit 12 may be adjusted in any desired manner.

The joint comprises a longitudinally split housing which consists of the two elements 51 and 52 and is constructed to receive at one end the arm 13 and at its other end the ring or annulus 53. The halves 51 and 52 of the housing are preferably identical and may be provided, if desired, with suitable aligning pins. The upper end of each of the halves 51, 52 is cut away and shouldered so as to provide two spaced and essentially parallel dished or recessed plates 54, 55. On their inner faces these plates have interrupted annular flanges 56, 57. When the two parts 51 and 52 are assembled, the ring 53 is clasped between them and embraces and rides on the flanges 56 and 57 thereby providing for the rotation of the ring 53 about its own axis. The ring 53 is preferably provided with a neck 58 which receives nipple 59 for attachment to the lamp fixture 12, thus forming a load carrier.

At its opposite end the housing being tubular in form receives the free end of the tube 13 and the housing rotates on the tube 13. The housing is for this purpose provided with an annular channel or groove 60 which receives a protuberance 61 on the tube 13, the tube 13 thereby being captured within the housing 51 and at the same time permitting rotation of the housing on the axis of the tube. The annular groove 60 is preferably provided with a stop 62 thereby limiting the rotation of the housing about the tube 13 to less than 360°. The housing is provided with a chamber 63 which has a diameter greater than the outer diameter of tube 13. The open end of the tube 13 receives a collar 65 which is provided with an outwardly directed annular flange 66 which rests on the shoulder 64 at the lower end of the enlarged chamber 63. A helical compressed spring 67 rests upon the flange 66 and is in contact at its other end with the lower face of the brake shoe 68 which at its upper end is provided with an arcuate surface 69 which presses against the outer face of the ring 63. Thus the brake shoe 68 pressed by the compressed spring 67 serves to retain the ring 53 together with the fixture or other load unit carried thereby in the desired adjusted position.

The brake shoe element 68 is designed and constructed to provide for the passage of electric cord. For this purpose it consists of a single casting which has at its lower end an annulus 70 and at its upper end a solid head 71 that includes the arcuate braking surface 69, the two parts being connected by a pair of parallel standards 72, each preferably provided with a rib 73 which loads in the corresponding groove 74 in the inner face of the housing 51 as shown. The annulus 70 is also preferably provided with a shoulder portion 75 which enters the spring 67 and cooperates with the end of the collar 65 which enters the opposite end of the spring 67. It will now be seen that when these parts are assembled the spring 67 is under compression and presses the braking surface 69 against the ring 53. The two halves of the housing 51 may be held in their assembled position in any desirable manner and as shown herein the interiorly threaded ring 76 cooperates with the threads on the housing 51 to hold its parts assembled.

The dished portions 54, 55 of the two halves of the housing will be seen to extend downwardly below the brake shoe 71, thus providing for the cord to enter the brake element through the lower annulus 70 and out from the brake shoe, as shown, in either direction. The cord then enters the ring 53 and out through the nipples 58, 59 toward the fixture.

The main body portion of the collar 65 enters the tube 13 as shown and is rendered substantially integral therewith by a drive fit. The spring 67 presses the flange 66 of the collar against the shoulder 64 to exert a frictional braking resisting rotary movement of the housing 51 on the tube 13.

The present organization therefore provides the two degrees of movement of the load unit with reference to the arm 13, one on the axis of the arm 13 and the other on an axis perpendicular to arm 13 and the single spring 67 serves to exert a braking force against both movements. By this simple rugged construction the load unit may be adjusted manually to any desired position and the spring acts through the braking elements 66 and 68 to retain the load unit in the adjusted position.

The braking element 66 is affixed to the tube 13 by the collar 65. It will be understood however that, if desired, the braking element 66 may be formed by a spinning operation from the material of the tube 13.

I claim:

1. A support providing variable adjustment of a load unit thereon, comprising a load carrier including an annulus, an elongated longitudinally split housing comprising a pair of mating elements having a tubular section at one end and cut-away portions having means rotatably holding said annulus between said elements at the other end, at least one of said elements being recessed adjacent said annulus to provide a passage between said tubular section and the interior of said annulus, a brake shoe disposed in said housing having an arcuate surface bearing against said annulus and providing constant braking surface contact during movement of said annulus, and a spring disposed in said tubular section and bearing against said brake shoe to press the same against the annulus, thereby providing for movement of the load unit about the axis of the annulus and holding the same in its adjusted position.

2. A support providing variable adjustment of a load unit thereon, comprising a load carrier including an annulus, a split housing comprising a pair of mating elements having a tubular section at one end and cut-away portions having means rotatably holding said annulus between said elements at the other end, a brake shoe disposed in said housing having an arcuate surface bearing against said annulus and providing constant braking surface contact during movement of said annulus, and a spring disposed in said tubular section and bearing against said brake shoe to press the same against the annulus, thereby providing for movement of the load unit about the axis of the annulus and holding the same in its adjusted position.

3. A joint for a jointed electric fixture comprising an annulus having a radial passage, a split housing comprising a pair of mating elements having a tubular section at one end and cut-away portions at the other end, said cut-away portions having means rotatably holding said annulus between said elements, at least one of said elements being formed with a recess adjacent said annulus, means for retaining said elements in mated assembly, a brake shoe disposed in said housing having an arcuate surface bearing against said annulus and providing constant braking surface contact during movement of said annulus, the brake shoe having a passage connecting the tubular section and said recess, and a spring disposed in said tubular section and bearing against said brake shoe to press the same against the annulus; thereby providing for movement of the annulus about its axis and holding the same in its adjusted position and enabling the passage of a conductor through the joint from said tubular section to the radial passage in said annulus.

4. The support of claim 1 in which the brake shoe is provided with a passage connecting the tubular section of the support and the recessed portion of the housing elements.

5. The support of claim 4 in which the brake shoe and housing have interengaging means which provide for relative longitudinal movement therebetween but prevent relative rotational movement therebetween.

6. The support of claim 2 which includes a tubular arm received in the tubular section of the housing, the housing being rotatable about said arm, the tubular section having an inner annular shoulder and the tubular arm having an annular flange engaging said shoulder, the spring pressing the flange against the shoulder and thereby braking the relative rotational movement of the housing and tubular arm.

LEON BOLTUCH.

References Cited in the file of this patent

UNITED STATES PATENTS

| Number | Name | Date |
|---|---|---|
| 376,130 | Armstrong | Jan. 10, 1888 |
| 1,927,703 | Glowacki | Sept. 19, 1933 |
| 1,963,278 | Pieper | June 19, 1934 |
| 2,256,763 | Reed | Sept. 23, 1941 |
| 2,456,182 | Goble | Dec. 14, 1948 |
| 2,476,850 | Fiori et al. | July 19, 1949 |
| 2,617,619 | Versen | Nov. 11, 1952 |
| 2,632,660 | Krauthamer | Mar. 24, 1953 |